United States Patent [19]

Ichikawa

[11] Patent Number: 5,111,197
[45] Date of Patent: May 5, 1992

[54] APPARATUS FOR ALLOCATING SUBSCRIBER IDENTIFICATION NUMBERS TO PLURAL SERVICE ZONES IN A PAGING SYSTEM

[75] Inventor: Yoshio Ichikawa, Tokyo, Japan

[73] Assignee: NEC Corporation, Tokyo, Japan

[21] Appl. No.: 483,314

[22] Filed: Feb. 21, 1990

Related U.S. Application Data

[63] Continuation of Ser. No. 165,056, Mar. 7, 1988, abandoned.

[30] Foreign Application Priority Data

Mar. 6, 1987 [JP] Japan .................................. 62-50377

[51] Int. Cl.⁵ ............................................... H04B 7/00
[52] U.S. Cl. ............................. 340/825.44; 340/311.1; 379/56; 379/57
[58] Field of Search ............ 340/825.44, 311.1, 825.48; 455/31, 33; 379/56, 57, 59, 60; 370/94.1

[56] References Cited

U.S. PATENT DOCUMENTS

| | | | |
|---|---|---|---|
| 3,310,741 | 3/1967 | Uitermark et al. | 455/33 |
| 4,144,409 | 3/1979 | Utano et al. | 455/33 |
| 4,644,351 | 2/1987 | Zabarsky et al. | 340/825.44 |
| 4,713,808 | 12/1987 | Gaskill et al. | 370/94.1 |
| 4,754,453 | 6/1988 | Eizenhöfer | 379/63 |
| 4,763,322 | 8/1988 | Eizenhöfer | 379/63 |
| 4,878,051 | 10/1989 | Andros et al. | 340/825.44 |
| 4,914,649 | 4/1990 | Schwendeman et al. | 340/825.44 |

FOREIGN PATENT DOCUMENTS

| | | | |
|---|---|---|---|
| 0040954 | 12/1981 | European Pat. Off. | 379/59 |
| 0281150 | 3/1988 | European Pat. Off. | 379/57 |
| 3014859 | 10/1981 | German Democratic Rep. | 379/59 |

*Primary Examiner*—Donald J. Yusko
*Assistant Examiner*—Dervis Magistre
*Attorney, Agent, or Firm*—Sughrue, Mion, Zinn, Macpeak & Seas

[57] ABSTRACT

A paging system comprises a predetermined number of radio paging terminals each producing a subscriber identification number, a service zone signal, and a frequency signal respectively corresponding to a subscriber number, a paging processor for allocating subscriber identification numbers received from the radio paging terminals respectively to a predetermined number of paging service zones and a predetermined number of time slots in accordance with the service zone signals and frequency signals, and a predetermined number of transmitter for radiating paging signals provided in each of the paging service zones so that at least two paging signals having different frequencies which are obtained by modulating at least two of the subscriber identification numbers are radiated in two adjacent paging service zones at one of the time slots.

5 Claims, 7 Drawing Sheets

FIG. 4A

SUBSCRIBER FILE

| SUBSCRIBER NUMBER | SERVICE ZONE | FREQUENCY |
|---|---|---|
| ○ | Z1, Z2, Z3 | f1 |
| ◐ | Z1 | f2 |
| ◉ | Z1, Z2 | f3 |

FIG. 4B

| SUBSCRIBER NUMBER | SERVICE ZONE | FREQUENCY |
|---|---|---|
| □ | Z1, Z2, Z3 | f1 |
| ▨ | Z2 | f3 |

FIG. 4C

| SUBSCRIBER NUMBER | SERVICE ZONE | FREQUENCY |
|---|---|---|
| △ | Z1, Z2, Z3 | f2 |
| ▲ | Z3 | f3 |

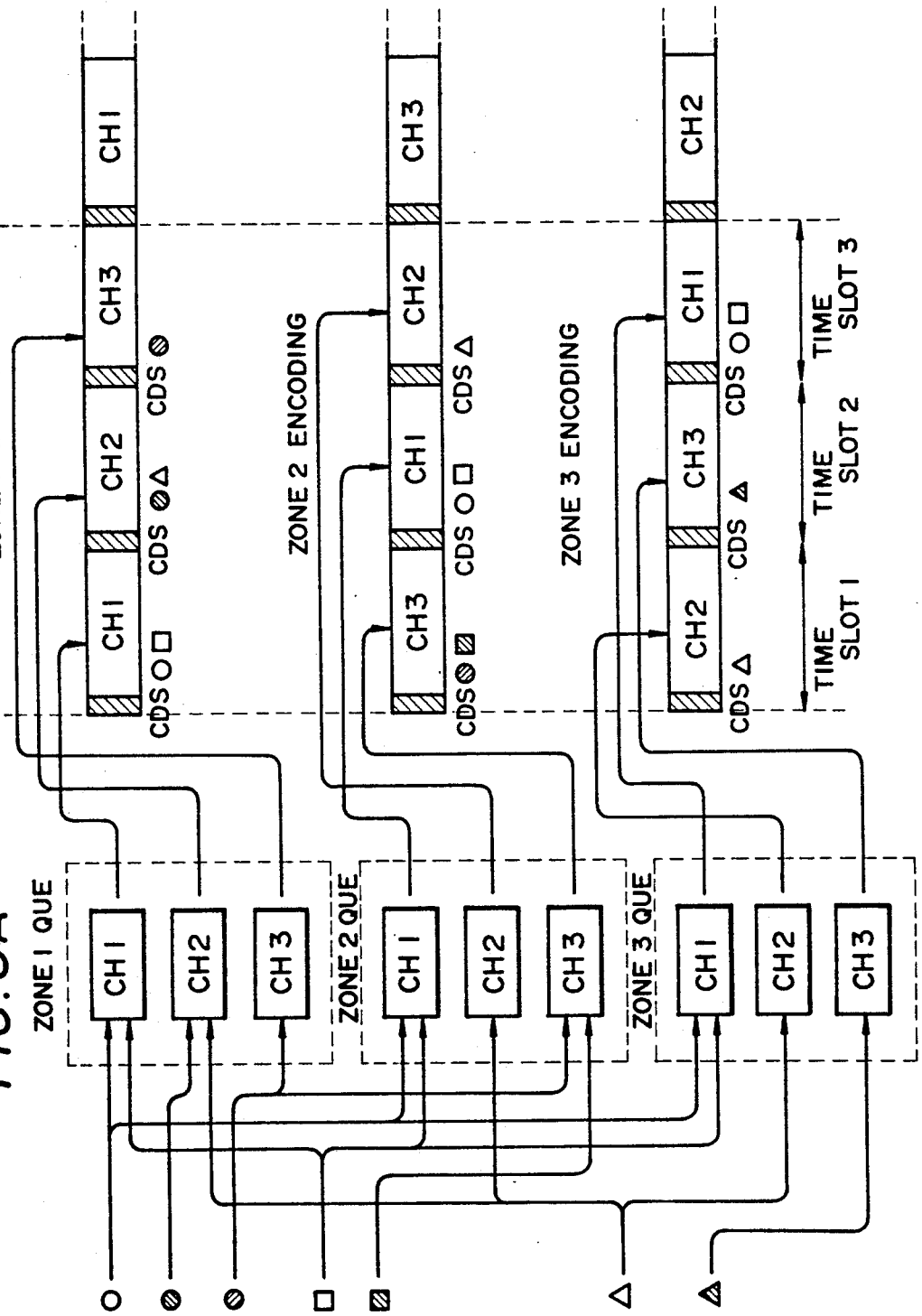

APPARATUS FOR ALLOCATING SUBSCRIBER IDENTIFICATION NUMBERS TO PLURAL SERVICE ZONES IN A PAGING SYSTEM

This is a Continuation of application Ser. No. 07/165,056 filed Mar. 7, 1988, now abandoned.

FIELD OF THE INVENTION

The invention relates to a paging system, and more particularly to a paging system in which calling signals of the same paging signal frequency can be used in more than two service zones.

BACKGROUND OF THE INVENTION

One of conventional paging systems comprises a plurality of apparatus each producing a paging signal in accordance with a calling signal which is received from a corresponding public switching telephone network. For instance, one of the apparatus covers a nation-wide service zone, and each of the remaining apparatus covers a corresponding one of local service zones. In each of the service zones, a paging signal is radiated from a plurality of antennas of the apparatus so that one of pager receivers each having a fixed receiving signal frequency can receive the paging signal.

According to the conventional paging system, however, frequencies of paging signals for the nationwide service zone must be different from those of paging signals for the local service zones, and the same allocation of frequencies must be performed in two adjacent local service zones having an overlapping service area for the reason why a phasing of those paging signals can not be performed in the service zones. Further, a pager receiver must be replaced by one having another fixed receiving signal frequency in a case where a service zone is changed for a subscriber. As a result, an effective utilization of frequencies can not be realized in the conventional paging system.

SUMMARY OF THE INVENTION

Accordingly, it is an object of the invention to provide a paging system in which the same paging signal frequency can be used in more than two service zones having an overlapping service area.

It is a further object of the invention to provide a paging system in which a pager receiver can be used in more than two service zones.

It is a still further object of the invention to provide a paging system in which an effective utilization of frequencies can be realized.

According to the invention, a paging system comprises, a predetermined number of radio paging terminals each having a subscriber file in which subscriber numbers, service zone informations and frequency informations are stored, each of said radio paging terminals produces a pager identification number, a service zone signal, and a frequency signal respectively corresponding to a subscriber number when each of said radio paging terminals finds said subscriber number to be registered in said subscriber file, a paging processor in which a queing of pager identification numbers received from said predetermined number of said radio paging terminals is performed in accordance with service zone signals further received therefrom so that said pager identification numbers are allocated to respective designated service zones, said pager identification numbers in each of said respective designated service zones are further allocated to a predetermined number of time slots in accordance with frequency signals still further received from said predetermined number of said radio paging terminals, said pager identification numbers thus allocated in regard to said service zone and frequency signals are encoded to produce pager identification number signals, and channel designating signals are added to said pager identification number signals in accordance with said frequency signals, a predetermined number of expanders each dividing said pager identification number signals having said channel identification signals in each of paging service zones into a predetermined number of said pager identification number signals, and a predetermined number of transmitters which are provided in said each of said paging service zones, each of said predetermined number of said transmitters radiating one of said pager identification number signals in a frequency designated by one of said channel designating signals, wherein said predetermined number of said time slots are synchronized among said paging service zones, and at least two of said pager identification number signals are radiated with different frequencies in two adjacent paging service zones at one of said time slots.

BRIEF DESCRIPTION OF THE DRAWINGS

The invention will be explained in more detail in conjunction with following drawings wherein.

DESCRIPTION OF A PREFERRED EMBODIMENT

Figure 1:
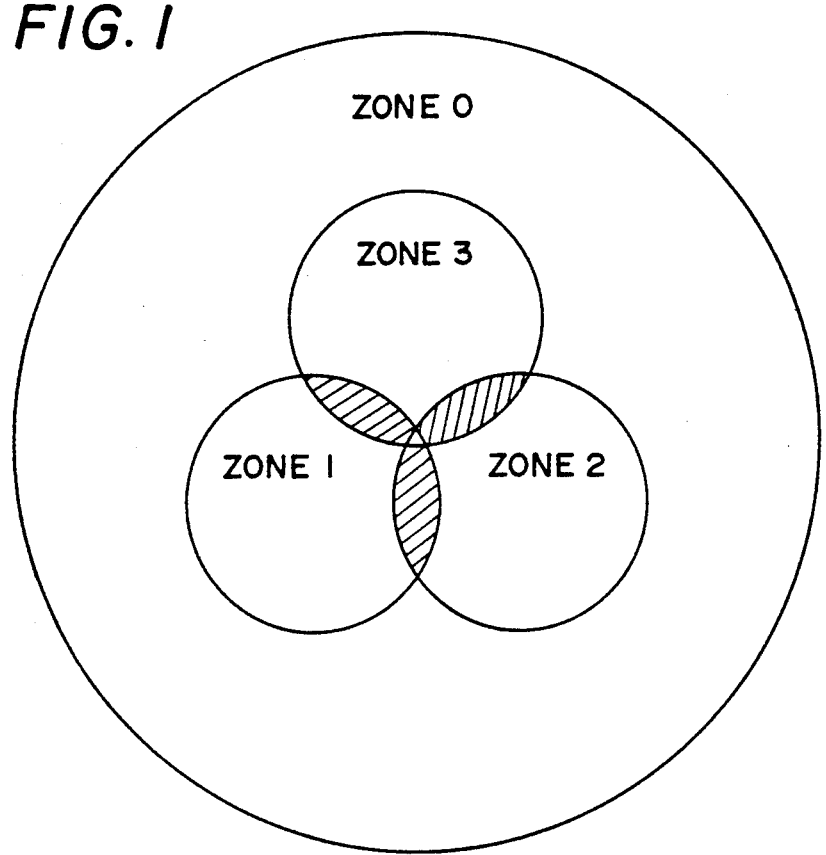
FIG. 1 is an explanatory diagram showing a nationwide service zone and local service zones.

FIG. 1 shows four service zones 0 to 3 which are covered by a paging system. The service zone 0 is of a nation-wide service zone, and the service zones 1 to 3 are of local service zones having overlapping service areas indicated by hatchings. In the conventional paging system as explained before, therefore, frequencies of paging signals must be different in the four service zones 0 to 3 from others because a phasing of those paging signals can not be peformed therein.

Figure 2:
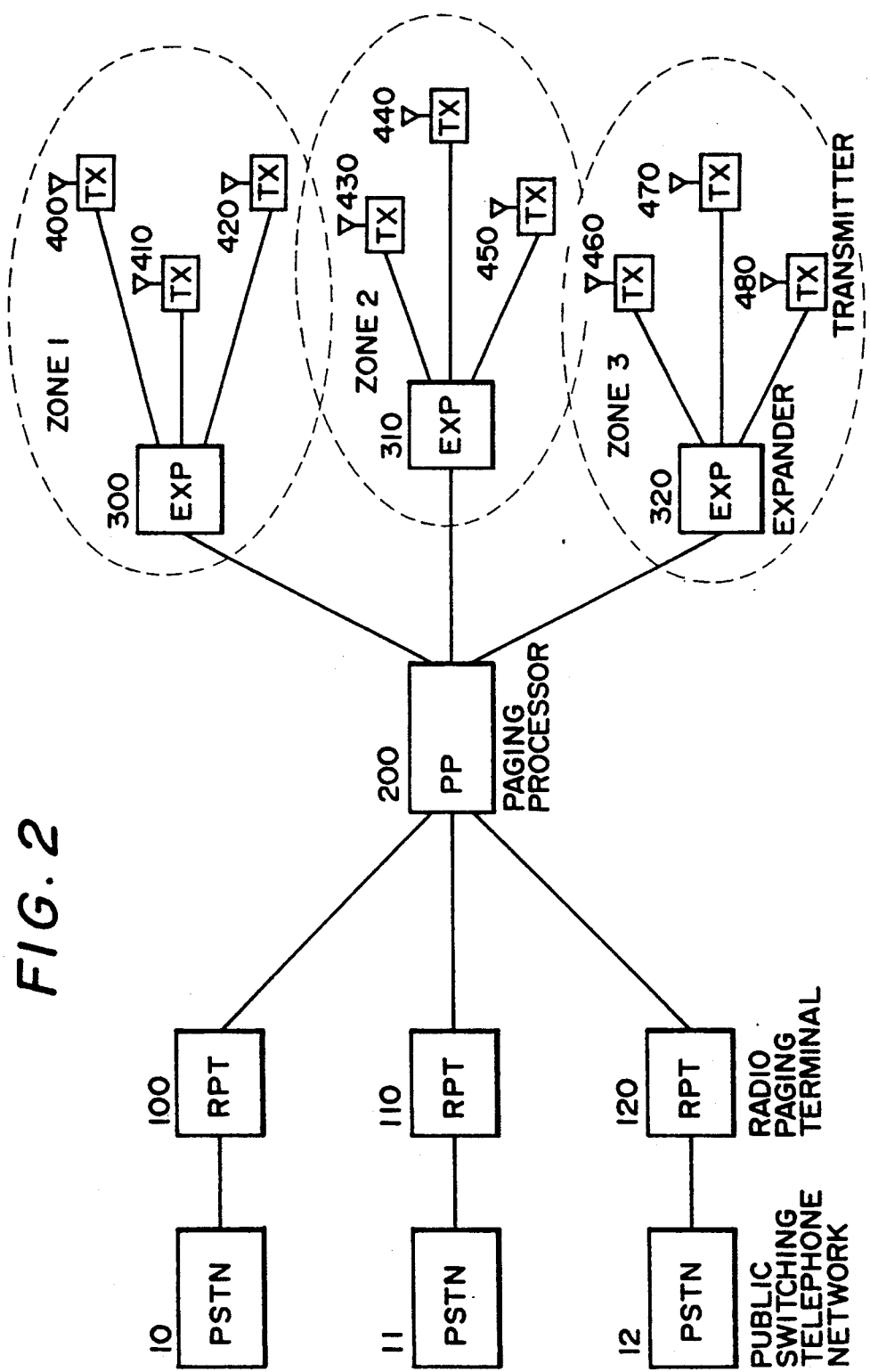
FIG. 2 is a block diagram showing a paging system in an embodiment according to the invention.

FIG. 2 shows a paging system in an embodiment according to the invention. The paging system comprises radio paging terminals 100, 110 and 120 respectively connected to public switching telephone networks 10, 11 and 12 thereby to receive calling signals from telephone sets, a paging processor 200 for queing pager identification numbers received from the radio paging terminals 100, 110 and 120 in each of local service zones 1 to 3 in accordance with service zone informations further received therefrom and for encoding the pager identification numbers allocated sequentially by frequency informations still further received therefrom to produce pager identification number signals, expanders 300, 310 and 320 respectively positioned in the local service zones 1 to 3 for dividing the pager identification number signals by the number of transmitters, and transmitters 400, 410 and 420, 430, 440 and 450, and 460, 470 and 480 respectively connected to the expanders 300, 310 and 320 in the local service zones 1 to 3 for modulating the pager identification number signals to radiate paging signals.

Figure 3:
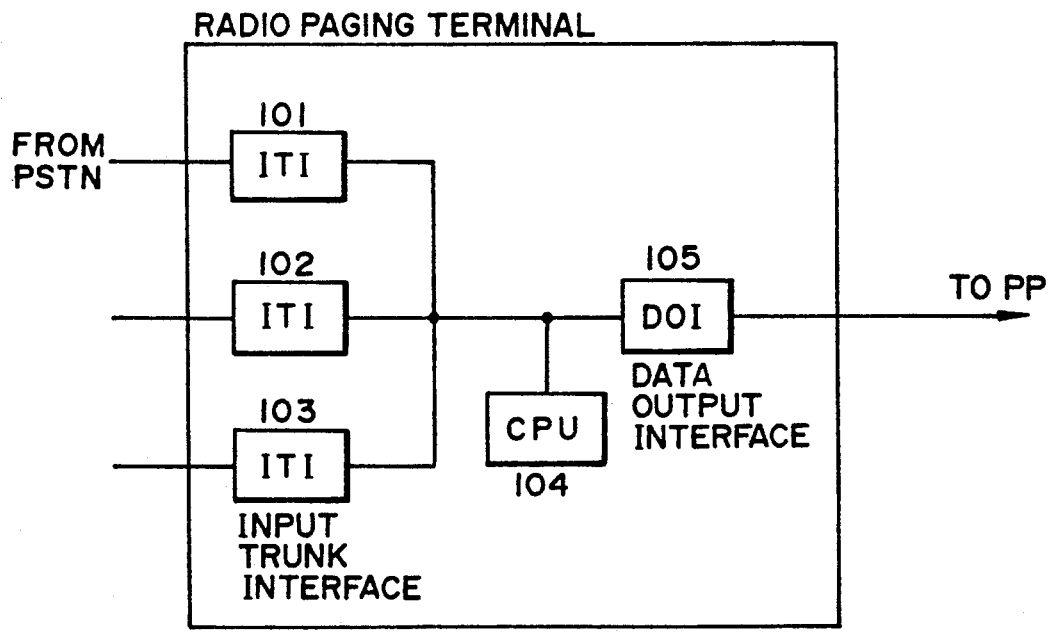
FIG. 3 is a block diagram showing a radio paging terminal in the embodiment in FIG. 2, FIGS. 4A to 4C are explanatory diagrams showing subscriber files in the radio paging terminals in FIG. 3.

FIG. 3 shows one of the radio paging terminals 100, 110 and 120 which comprises input trunk interfaces 101, 102 and 103 for receiving subscriber numbers from a corresponding one of the public switching telephone networks 10, 11 and 12, a central processing unit 104 having subscriber files to be described later, and a data output interface 105 through which informations of pager identification numbers, service zones and frequencies are supplied to the paging processor 200.

FIGS. 4A to 4C show the subscriber files contained in the central processing units 104 of the radio paging terminals 100, 110 and 120. In the subscriber files, symbols ○, and , □ and □, and Δ and indicate subscriber numbers wherein the symbols ○, □, and Δ designate all of the local service zones 1 to 3 ($Z_1$ to $Z_3$), the symbol designates two of the local service zones 1 and 2 ($Z_1$ and $Z_2$), and the symbols , and designate one of the local service zones 1 to 3, that is, is the local service zone 1($Z_1$) , is the local service zone 2($Z_2$), and is the local service zone 3($Z_3$). Frequencies of the paging signals are indicated in the subscriber files by "$f_1$", "$f_2$" and "$f_3$" which correspond to channels CH1 to CH3.

The subscriber files further include pager identification numbers corresponding to the subscriber numbers wherein the subscriber numbers are converted into the pager identification number in the central processing units 104. In the embodiment to be described hereinafter, the pager identification numbers may be identical to the subscriber numbers and also indicated by the same symbols as described above.

Figure 5:
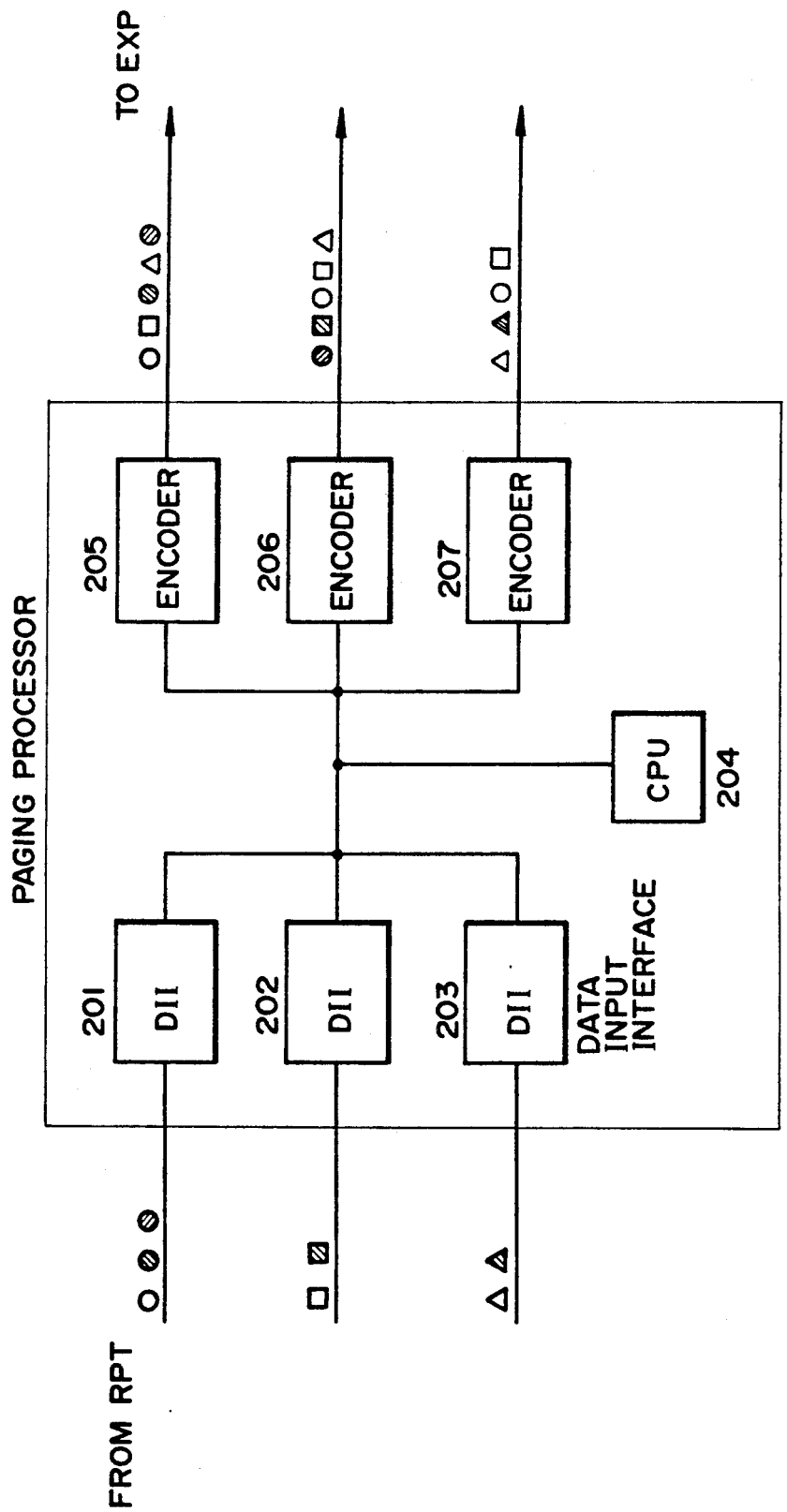
FIG. 5 is a block diagram showing a paging processor in the embodiment in FIG. 2.

FIG. 5 shows the paging processor 200 which comprises data input interfaces 201, 202 and 203 through which the informations stored in the subscriber files shown in FIGS. 4A to 4C are received therein, a central processing unit 204 for queing pager identification numbers in each of the local service zones 1 to 3 in accordance with the local service zone informations $Z_1$ to $Z_3$, and encoders 205, 206 and 207 for encoding the pager identification numbers allocated sequentially by the frequency informations $f_1$, $f_2$ and $f_3$ to produce pager identification number signals of a sequential order CH1, CH2 and CH3 for the local service zone 1, a sequential order CH3, CH1 and CH2 for the local service zone 2, and sequential order CH2, CH3 and CH1 for the local service zone 3.

Figure 6:
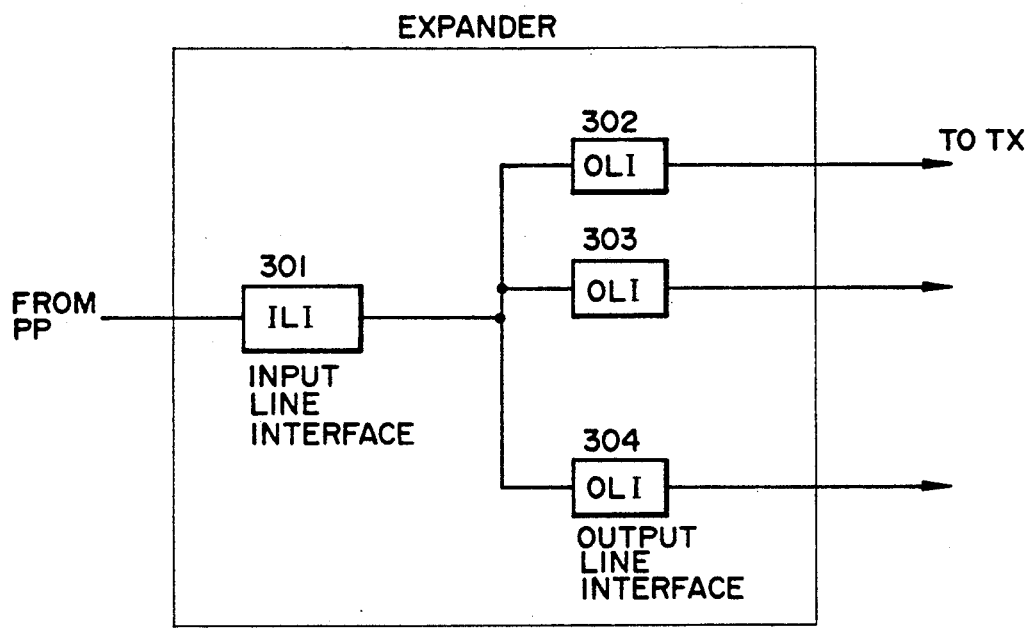
FIG. 6 is a block diagram showing an expander in the embodiment in FIG. 2.

FIG. 6 shows one of the expanders 300, 310 and 320 respectively positioned in the local service zones 1 to 3 which comprises an input line interface 301 through which the pager identification number signals are received therein, and output line interfaces 302, 303 and 304 each having a fixed delaying circuit for a phasing of the pager identification number signals, and through which distributed pager identification number signals are supplied to the transmitters 400, 410 and 420, 430, 440 and 450, and 460, 470 and 480.

Figure 7:
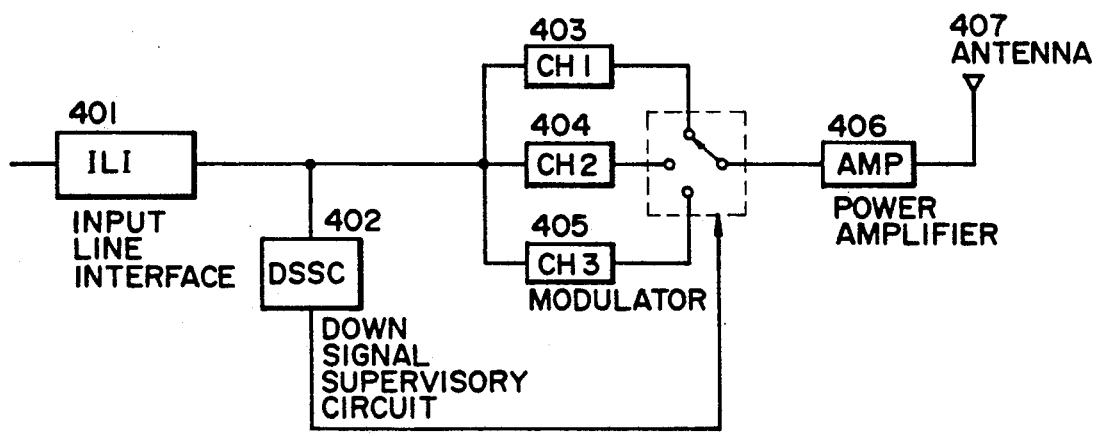
FIG. 7 is a block diagram showing a transmitter in the embodiment in FIG. 2, FIGS. 8A and 8B are explanatory diagrams showing an operation of the embodiment and a paging signal therein.

FIG. 7 shows one of the transmitters in the local service zones 1 to 3 which comprises an input line interface 401 through which one of the distributed pager identification number signals is received therein, a down signal supervisory circuit 402 for selecting one of channels CH1 to CH3 in accordance with channel designating signals, modulators 403, 404 and 405 for producing CH1 to CH3 paging signals and one of which is selected by the down signal supervisory circuit 402, a power amplifier 406 for amplifying one of the modulated paging signals, and an antenna 407 for radiating the paging signals to be received by pager receivers.

In operation, a subscriber makes a telephone call in one of the public switching telephone network 10, 11 and 12 so that a calling signal including a subscriber number is received in a corresponding one of the radio paging terminals 100, 110 and 120. In the same manner, several calling signals are received in the radio paging terminals 100, 110 and 120. The subscriber numbers are checked as to whether or not the subscribers are registered in the paging system. In a case where the subscribers are registered therein, the central processing units 104 of the respective radio paging terminals 100, 110 and 120, produces a pager identification number based on a subscriber number, and read the service zone informations $Z_1$, $Z_2$ and $Z_3$ and the frequency informations $f_1$, $f_2$ and $f_3$ corresponding to the subscriber numbers from the subscriber files shown in FIGS. 4A to 4C. The data including the pager identification numbers, the service zone informations and the frequency informations are supplied through the data output interface 105 to the paging processor 200 in which the queing of the pager identification numbers is performed for each of the local service zones 1 to 3 in the central processing unit 204. Considering the subscriber number indicated by the symbol ○, for instance, the pager identification number is allocated to the channels CHs 1 of the local service zones 1 to 3 in accordance with the informations $Z_1$, $Z_2$ and $Z_3$, and $f_1$ as shown in FIG. 8A. As to the subscriber number indicated by the symbol Δ, for instance, the pager identification number is allocated to the channels CHs 2 of the local service zones 1 to 3 in accordance with the informations $Z_1$, $Z_2$ and $Z_3$ and $f_2$. After the queing of the pager identification numbers is finished, the pager identification numbers are encoded in each of the local service zones 1 to 3 in accordance with the sequential channel order described before as shown in FIG. 8A. In other words, one cycle of, for instance, one minutes in which channel designating signals CDSs and sequentially arranged pager identification numbers of CH1 to CH3 are included is divided into three time slots 1 to 3. Considering the channel CH1 of the local service zone 1, for instance, a channel designating signal CDS is positioned in front of the pager identification numbers as indicated by the symbols ○ and □. In the time slot 1 of the local service zone 1, the one cycle comprises a channel designating signal CDS for designating the channel CH1, a preamble signal PRE for the bit synchronization of a pager receiver, a synchronization signal SC for the word synchronization of a pager receiver, a pager identification number D1 for designating the subscriber number indicated by the symbol ○, and a pager identification number D2 for designating the subscriber number indicated by the symbol □. An encoding of pager identification numbers is performed by use of, for instance, POCSAG code.

Figure 8B:
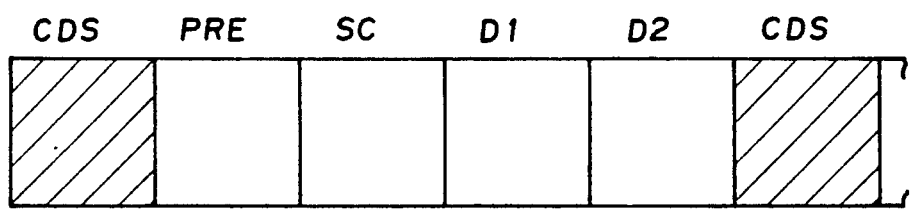

The pager identification number signals thus encoded are supplied to the expanders 300, 310 and 320 by which the pager identification number signals are distributed to be supplied to the transmitters 400, 410 and 420 in the local service zone 1, the transmitters 430, 440 and 450 in the local service zone 2, and the transmitters 460, 470 and 480 in the local service zone 3 respectively. In this occasion, the divided signals are delayed to predetermined extents in the output line interfaces 302, 303 and 304 of the expanders 300, 310 and 320 to realize a phasing of the radiated signals from the transmitters 400, 410 and 420 in the local service zone 1, the transmitters 430, 440 and 450 in the local service zone 2, and the transmitters 460, 470 and 480 in the local service zone 3. In each of the transmitters as described above, the channel designating signals CDSs are sequentially checked in the down signal supervisory circuit 402 thereby to select one of the modulators 403, 404 and 405 so that the modulator 403 is selected to modulate the pager identification number signals of the subscriber numbers indicated by the symbols ○ and □ at the time slot 1 in the local service zone 1 thereby producing paging signals, while the modulators 405 and 404 are selected at the same time in the local service zones 2 and 3 respectively. Consequently, the antennas 407 of the transmitters 400, 410 and 420 radiate the paging signals of the subscribers numbers indicated by the symbols ○ and □ sequentially, as shown in FIG. 8B, in the local service zone 1. At the present stage, there is occured no problem to call subscribers in the overlapping service area of the local service zones 1 and 2 because the transmitters 430, 440 and 450 radiate the paging signals of the channels CH3 for the subscriber numbers indicated by the symbols and as shown in FIG. 8A.

In the embodiment described above, the number of local service zones may be changed dependent on an area covered by a paging system. The data transmission is performed between each of the radio paging terminals and the paging processor, the paging processor and each of the expanders, and one of the expanders and each of the transmitters by use of, for instance, RS-232-C interface if data are transmitted in a building, and by use of, for instance, MODEM interface if data are transmitted between remote distance places.

Although the invention has been described with respect to specific embodiment for complete and clear disclosure, the appended claims are not to thus limited but are to be construed as embodying all modification and alternative constructions that may occur to one skilled in the art which fairly fall within the basic teaching herein set forth.

What is claimed is:

1. An apparatus for allocating subscriber identification numbers to plural service zones in a paging system, comprising:

plural ratio paging terminals each including a first control unit and a subscriber file for storing subscriber numbers, and pager identification numbers, service zones and signal frequencies corresponding to said subscriber numbers, and receiving subscriber numbers from a public switching telephone network, said control unit reading said pager identification number, said service zone and said signal frequency corresponding to said subscriber number received from said public switching telephone network out of said subscriber file;

a paging processor including a second control unit, plural queing means equal in number to said signal frequencies in each service zone, and plural paging signal encoders, and receiving information of said pager identification numbers, said service zones and said signal frequencies read out of said subscriber file from said plural radio paging terminals, said second control unit controlling each of said plural queing means to carry out queing operation exclusively for each of said service zones in accordance with said information, whereby each of said pager identification numbers is allocated to at least one service zone to have at least one of said signal frequencies, said second control unit controlling said each of said plural queing means to carry out time slot allocating operation exclusively for said each of said service zones in accordance with a predetermined order of said signal frequencies, whereby paging signals, among which the frequency collision is avoided in two adjacent service zones of said service zones, are produced and said second control unit controlling said plural paging signal encoders to encode said paging signals;

plural expanders each belonging to a corresponding one of said service zones, and receiving said encoded paging signals from said paging processor to divide a corresponding one of said paging signals into a predetermined number of paging signals; and plural transmitters provided in said each of said service zones, each of said plural transmitters receiving one of said divided paging signals and radiating said one of said divided paging signals.

2. A paging system according to claim 1 wherein each of said said expanders is provided with output line interfaces through which predetermined number of said pager identification numbers are passed, each of said output line interfaces delaying a corresponding one of said pager identification numbers by a predetermined time.

3. The apparatus as defined in claim 1, wherein said at least one service zone to which said each pager identification number is changed by changing service zones stored in said subscriber file, and said each pager identification number is allocated to plural surface zones by writing plural surface zones into said service zones.

4. A paging system according to claim 1, wherein each of said transmitters includes a number of modulators each modulating a corresponding one of said pager identification numbers with a frequency designated by said paging processor.

5. A paging system according to claim 4, wherein said each of said transmitters includes a down signal supervisory circuit to activate a corresponding one of said modulators in accordance with the allocation of said pager identification numbers.

* * * * *